US012688107B2

(12) United States Patent
Muralidharan et al.

(10) Patent No.: US 12,688,107 B2
(45) **Date of Patent: *Jul. 21, 2026**

(54) PREDICTIVE MONITORING OF SOFTWARE APPLICATION FRAMEWORKS USING MACHINE-LEARNING-BASED TECHNIQUES

(71) Applicants: ATLASSIAN PTY LTD, Sydney (AU); ATLASSIAN US, INC., San Francisco, CA (US)

(72) Inventors: Karthik Muralidharan, Bangalore (IN); Sri Vardhamanan A, Chennai (IN); Aneesh Kundu, Delhi (IN)

(73) Assignees: ATLASSIAN PTY LTD, Sydney (AU); Atlassian US, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,080

(22) Filed: Aug. 27, 2024

(65) Prior Publication Data

US 2025/0103457 A1 Mar. 27, 2025

Related U.S. Application Data

(63) Continuation of application No. 17/486,293, filed on Sep. 27, 2021, now Pat. No. 12,105,610.

(51) Int. Cl.
| | |
|---|---|
| G06F 11/34 | (2006.01) |
| G06F 40/279 | (2020.01) |
| G06N 20/00 | (2019.01) |

(52) U.S. Cl.
CPC ......... *G06F 11/3409* (2013.01); *G06N 20/00* (2019.01); *G06F 40/279* (2020.01)

(58) Field of Classification Search
CPC ............... G06F 11/3409; G06F 40/279; G06F 11/0709; G06F 11/0769; G06F 11/0775;
(Continued)

(56) References Cited

U.S. PATENT DOCUMENTS

| | | |
|---|---|---|
| 11,700,169 B2 | 7/2023 | Ojha et al. |
| 11,704,188 B2 | 7/2023 | Gupta et al. |

(Continued)

OTHER PUBLICATIONS

Apparatuses, Computer-Implemented-Methods, And Computer Program Products For Improved Data Event Root Cause Identification And Remediation, U.S. Appl. No. 17/644,988.
(Continued)

*Primary Examiner* — Yair Leibovich
(74) *Attorney, Agent, or Firm* — Alston & Bird LLP

(57) ABSTRACT

Systems and methods provide techniques for more effective and efficient predictive monitoring of a software application framework. In response, embodiments of the present invention provide methods, apparatuses, systems, computing devices, and/or the like that are configured to enable effective and efficient predictive monitoring of a software application framework using incident signatures for the software application that are generated by using a natural language processing machine learning framework, a structured data processing machine learning model, and an incident severity level detection machine learning model.

20 Claims, 13 Drawing Sheets

(58) Field of Classification Search
CPC .......... G06F 11/3006; G06F 2201/865; G06F 11/302; G06F 40/30; G06F 11/327; G06N 20/00; G06N 3/044; G06N 3/0455; G06N 3/09
USPC ....................................................... 714/38.1
See application file for complete search history.

(56) References Cited

U.S. PATENT DOCUMENTS

| | | | |
|---|---|---|---|
| 11,726,889 B1 | 8/2023 | Rao et al. | |
| 11,924,064 B2 | 3/2024 | Mann | |
| 12,105,610 B2 * | 10/2024 | Muralidharan | ....... G06F 11/302 |
| 12,169,699 B2 | 12/2024 | Rao et al. | |
| 2018/0027006 A1 | 1/2018 | Zimmermann et al. | |
| 2019/0205667 A1 | 7/2019 | Avidan et al. | |
| 2023/0004835 A1 | 1/2023 | Sawhney et al. | |
| 2023/0021373 A1 | 1/2023 | Kabbinale et al. | |
| 2023/0305944 A1 | 9/2023 | Biswas et al. | |

OTHER PUBLICATIONS

Apparatuses, Methods, And Computer Program Products For Predictive Determinations Of Causal Change Identification For Service Incidents, U.S. Appl. No. 17/559,563.
Machine-Learning-Based Techniques For Determining Response Team Predictions For Incident Alerts In A Complex Platform, U.S. Appl. No. 17/454,838.
Machine-Learning-Based Techniques For Predictive Monitoring Of A Software Application Framework, U.S. Appl. No. 17/127,216.
Machine-Learning-Based Techniques For Predictive Monitoring Of A Software Application Framework, U.S. Appl. No. 17/657,237.
Methods, Apparatuses And Computer Program Products For Generating Responder Alert Data Objects Based on Global Alert Policy Data Objects And Inline Alert Policy Data Objects, U.S. Appl. No. 17/448,615.
Methods, Apparatuses and Computer Program Products For Generating Service Health Status Data Objects And Rendering Health Status Monitoring User Interfaces, U.S. Appl. No. 17/656,529.

* cited by examiner

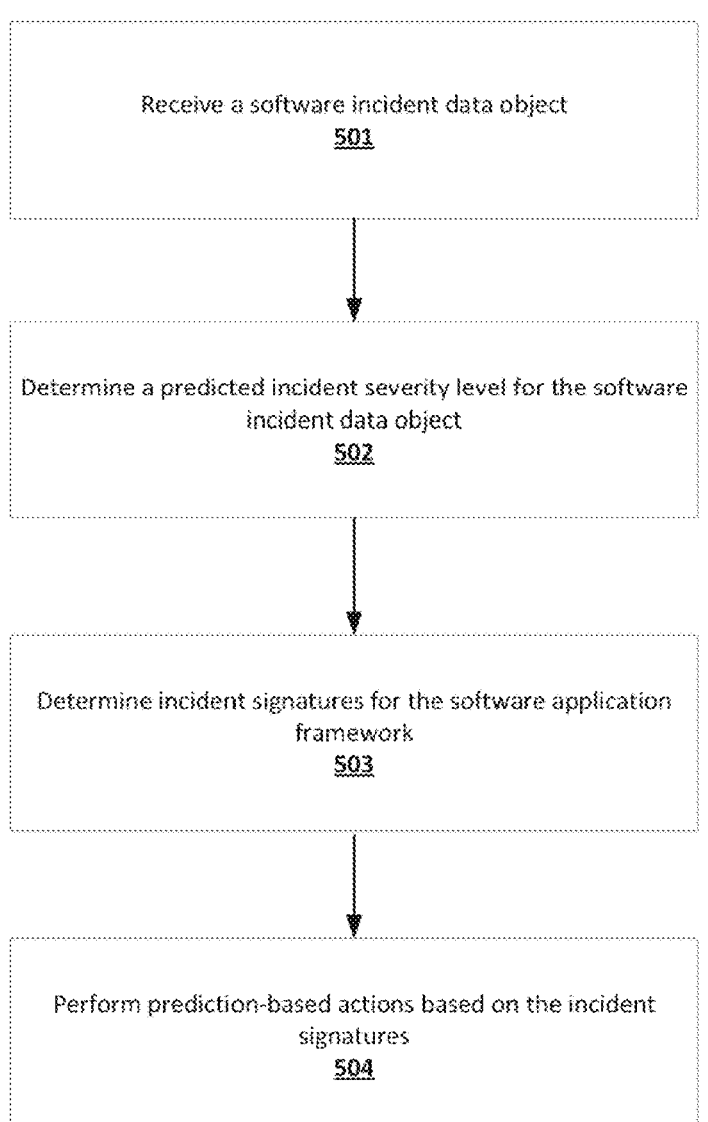
Receive a software incident data object
501
Determine a predicted incident severity level for the software
incident data object
502
Determine incident signatures for the software application
framework
503
Perform prediction-based actions based on the incident
signatures
504
FIG. 5

```
[
  ...,
  {                                                              700
    "name": "0", //alert group label
    "alerts": [
      {
711   "acknowledged": false,
712   "isSeen": false,
713   "count": 1,      713
714   "priority": "P2",
715   "message": "[prod-ops-us-west-2] JavaScript TypeError: t is not
a function",
716   "id": "d9bc4393-c7f1-4ale-9615-5e99c9efc6ae-1597738815815",
717   "owner": "",
718   "teams": "morpheus-ops",
719   "alias": "[prod-ops-us-west-2] OpsGenie Web_TypeError_/service
/list_t is not a function",
720   "createdAt": "2020-08-18 13:50:15.815000",
721   "updatedAt": "2020-08-18 13:50:15:945000",
722   "status": "open",
723   "lastOccuredAt": null,
724   "snoozedUntil": null,
725   "snoozed": false
      },

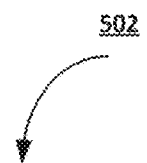
502
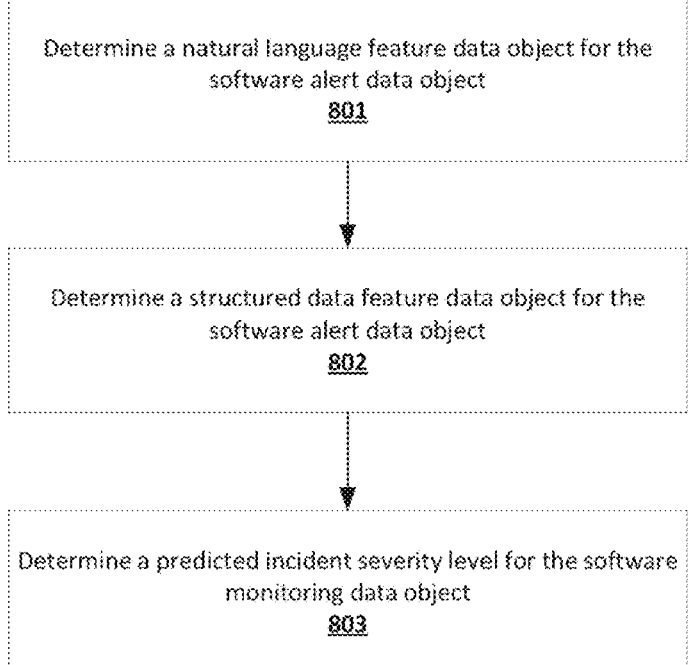
Determine a natural language feature data object for the software alert data object
801
Determine a structured data feature data object for the software alert data object
802
Determine a predicted incident severity level for the software monitoring data object
803
FIG. 8

1000

AUTO INCIDENT SEVERITY DETECTION MODELING

HOT-
96626          1001

SUBMIT

HOT-96626          1002
OPSGENIE SERVER TRIAL TRAIT NOT EVALUATING FOR TRIAL DATES 09 03. WE ARE NOT SEEING
OPSGENIE SERVER TRIAL TRAITS EVALUATING AFTER 09 03. THIS IS IMPACTING EVALUATION OF
WHICH DRIVES HOURLY OPSGENIE ONBOARDING EMAILS. TRACK EVENTS FOR OPSGENIE TRIALS
ARE BEING EMITTED BUT IT SEEMS ARE NOT BEING EMITTED WITH TRIAL DATE 09-03 SEE QUERY
BELOW. SELECT FROM CLOUD.EVENT_TRACK WHERE ACTION STARTED AND ACTIONSUBJECT TRIAL
AND EVENTNAME LIKE SERVER AND PRODUCT OPSGENIE AND ATTRIBUTES TRIALSTARTDATE 2021
09-04 AND DAY 2021 09 03 LIMIT 10.
SEVERITY LEVEL
3   1003
PREDICTION
3   1004

RAISE THIS REQUEST ON BEHALF OF

[icon] KARTHIK [_____ ∨]

SUMMARY

[_____1301_____]

WHAT'S THE EMERGENCY?
DESCRIPTION

[_____1302_____]

WHAT'S THE IMPACT TO CUSTOMERS? INCLUDE YOUR CONTACT DETAILS
SO RESPONDERS CAN REACH YOU.
SEVERITY LEVEL

[3 - MINOR          1303                    ∨]

HOW DO I DETERMINE INCIDENT SEVERITY? CHOOSING SEV2, 1 OR
0 MEANS YOU BELIEVE THIS MUST BE RESOLVED RIGHT NOW - PEOPLE
WILL BE PAGED.
FAULTY SERVICE

1304   [TYPE TO SEARCH                           | ∨]

THIS SERVICE (FROM MICROSCOPE) THAT HAS THE FAULT THAT'S
CAUSING THE INCIDENT. TAKE YOUR BEST GUESS IF UNSURE.
SELECT "UNKNOWN" IF YOU HAVE NO IDEA.
AFFECTED PRODUCTS (OPTIONAL)
　　□ ACCESS
　　□ BITBUCKET CLOUD
　　□ COMPASS
　　□ CONFLUENCE CLOUD
　　□ HALP
　　□ JIRA ALIGN
　　□ JIRA SERVICE MANAGEMENT
1305　□ JIRA SOFTWARE
　　□ JIRA WORK MANAGMENT
　　□ MARKETPLACE
　　□ NONE
　　□ OPSGENIE
　　□ STATUSPAGE
　　□ TRELLO
　　□ UKNOWN
WHICH PRODUCTS ARE AFFECTED BY THIS INCIDENT? SELECT ALL
THAT APPLY. (FOR JIRA FAMILY INCIDENTS, SELECT ALL AFFECTED
JIRA PRODUCTS)
ATTACHMENT (OPTIONAL)

◇ DRAG AND DROP FILES, PASTE SCREENSHOTS, OR BROWSE
1306

GRAPHS, ERRORS ETC.

FIG. 13

PREDICTIVE MONITORING OF SOFTWARE APPLICATION FRAMEWORKS USING MACHINE-LEARNING-BASED TECHNIQUES

CROSS REFERENCE TO RELATED APPLICATIONS

This application is a continuation of U.S. application Ser. No. 17/486,293, filed Sep. 27, 2021, the contents of which is hereby incorporated by reference in its entirety.

BACKGROUND

Various methods, apparatuses, and systems are configured to provide techniques for monitoring software application frameworks. Applicant has identified many deficiencies and problems associated with existing methods, apparatuses, and systems for monitoring software application frameworks. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable effective and efficient monitoring of software application frameworks. For example, certain embodiments of the present invention provide methods, apparatuses, systems, computing devices, and/or the like that are configured to perform software application framework monitoring using incident signatures for the software applications that are generated by using a natural language processing machine learning framework, a structured data processing machine learning model, and an incident severity level detection machine learning model.

In accordance with one aspect, a computer-implemented method is provided. In one embodiment, the computer-implemented method comprises: determining, based on one or more natural language data fields of a software incident data object for a software application framework and using a natural language feature extraction machine learning model, a natural language feature data object for the software incident data object; determining, based on one or more structured data fields of the software incident data object and using a structured data feature extraction machine learning model, a structured data feature data object for the software incident data object; determining, based on the natural language feature data object and the structured data feature data object and using an incident severity level detection machine learning model, a predicted incident severity level for the software incident data object; determining, based on the predicted incident severity level, one or more incident signatures for the software application framework; and performing one or more prediction-based actions based on the one or more incident signatures.

In accordance with another aspect, a computer program product is provided. The computer program product may comprise at least one computer-readable storage medium having computer-readable program code portions stored therein, the computer-readable program code portions comprising executable portions configured to: determine, based on one or more natural language data fields of a software incident data object for a software application framework and using a natural language feature extraction machine learning model, a natural language feature data object for the software incident data object; determine, based on one or more structured data fields of the software incident data object and using a structured data feature extraction machine learning model, a structured data feature data object for the software incident data object; determine, based on the natural language feature data object and the structured data feature data object and using an incident severity level detection machine learning model, a predicted incident severity level for the software incident data object; determine, based on the predicted incident severity level, one or more incident signatures for the software application framework; and perform one or more prediction-based actions based on the one or more incident signatures.

In accordance with yet another aspect, an apparatus comprising at least one processor and at least one memory including computer program code is provided. In one embodiment, the at least one memory and the computer program code may be configured to, with the processor, cause the apparatus to: determine, based on one or more natural language data fields of a software incident data object for a software application framework and using a natural language feature extraction machine learning model, a natural language feature data object for the software incident data object; determine, based on one or more structured data fields of the software incident data object and using a structured data feature extraction machine learning model, a structured data feature data object for the software incident data object; determine, based on the natural language feature data object and the structured data feature data object and using an incident severity level detection machine learning model, a predicted incident severity level for the software incident data object; determine, based on the predicted incident severity level, one or more incident signatures for the software application framework; and perform one or more prediction-based actions based on the one or more incident signatures.

BRIEF DESCRIPTION OF THE SEVERAL VIEW OF THE DRAWINGS

Having thus described some embodiments in general terms, references will now be made to the accompanying drawings, which are not drawn to scale, and wherein:

FIG. 5 is a flowchart diagram of an example process for predictive monitoring of a software application framework in accordance with at least some embodiments of the present invention.

Figure 6:
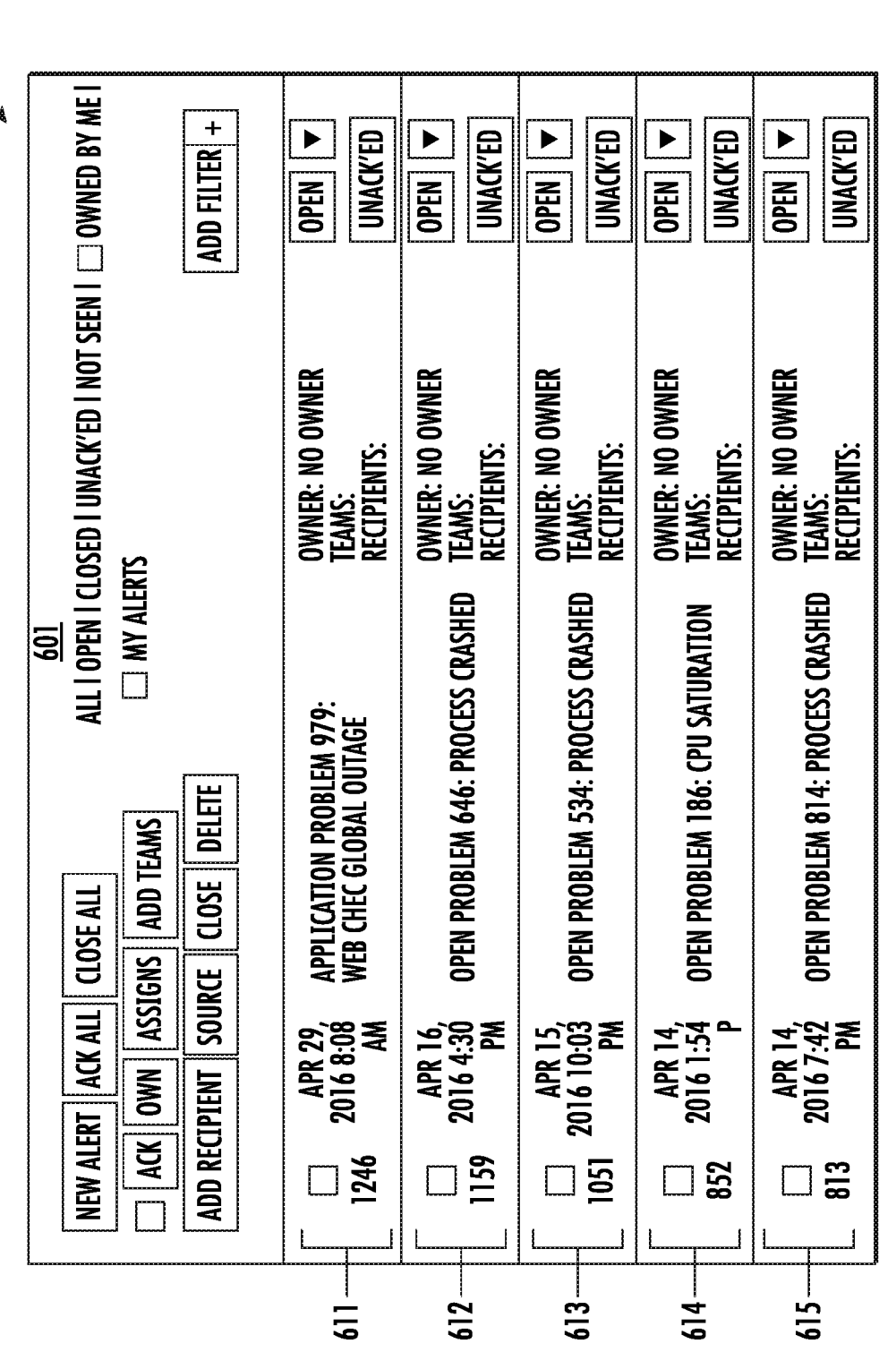

FIG. 6 provides an operational example of a software monitoring data display user interface in accordance with at least some embodiments of the present invention.

FIG. 7 provides an operational example of an incident signature in accordance with at least some embodiments of the present invention.

FIG. 8 is a flowchart diagram of an example process for determining a predicted incident severity level for a software incident data object in accordance with at least some embodiments of the present invention.

Figure 9:
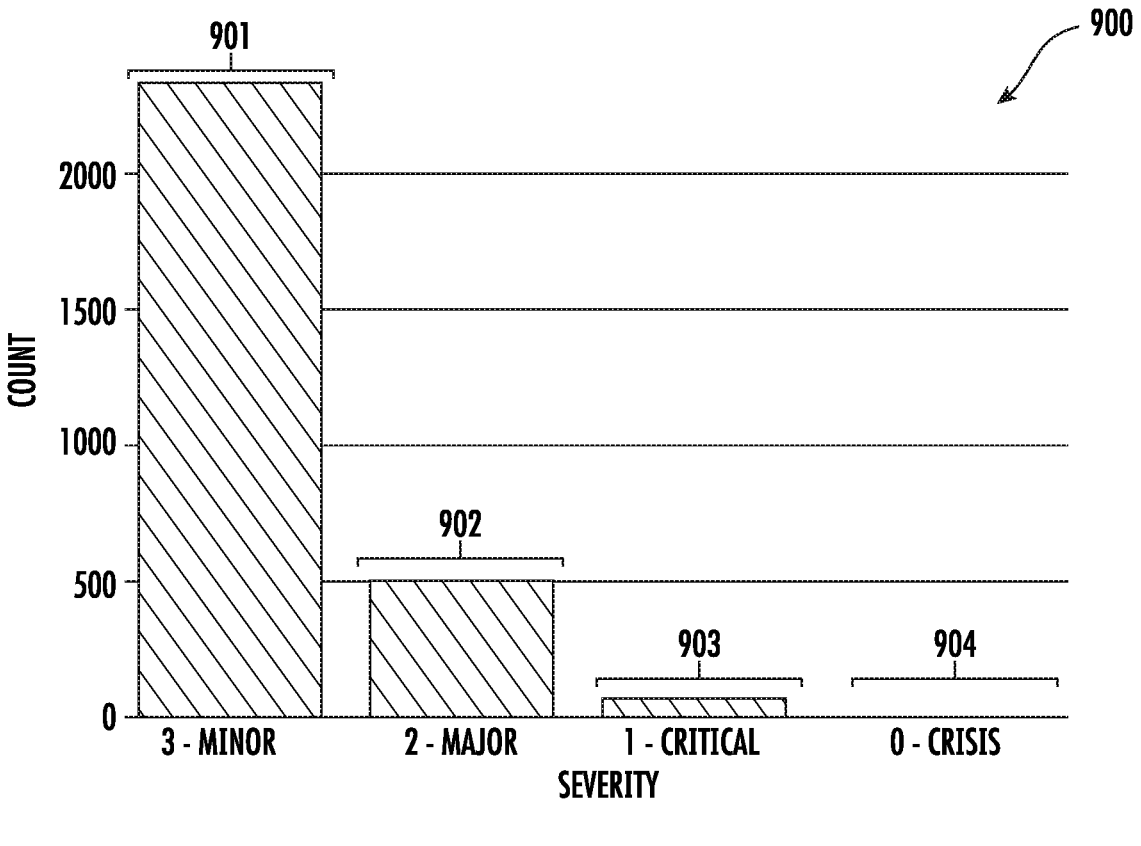

FIG. 9 provides an operational example of a user interface that depicts alert counts for a set of predicted incident severity levels in accordance with at least some embodiments of the present invention.

FIG. 10 provides an operational example of a user interface that depicts a predicted incident severity level and a human-generated incident severity level for a software incident data object in accordance with at least some embodiments of the present invention.

Figure 11:
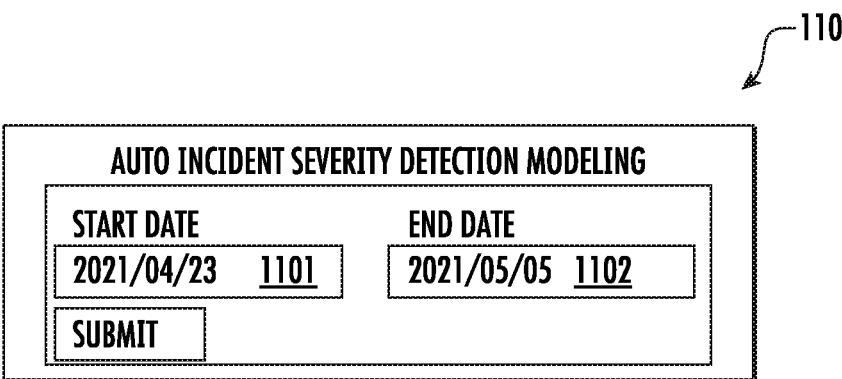

FIG. 11 provides an operational example of a user interface that enables an end user to select a date range for an incident signature in accordance with at least some embodiments of the present invention.

Figure 12:
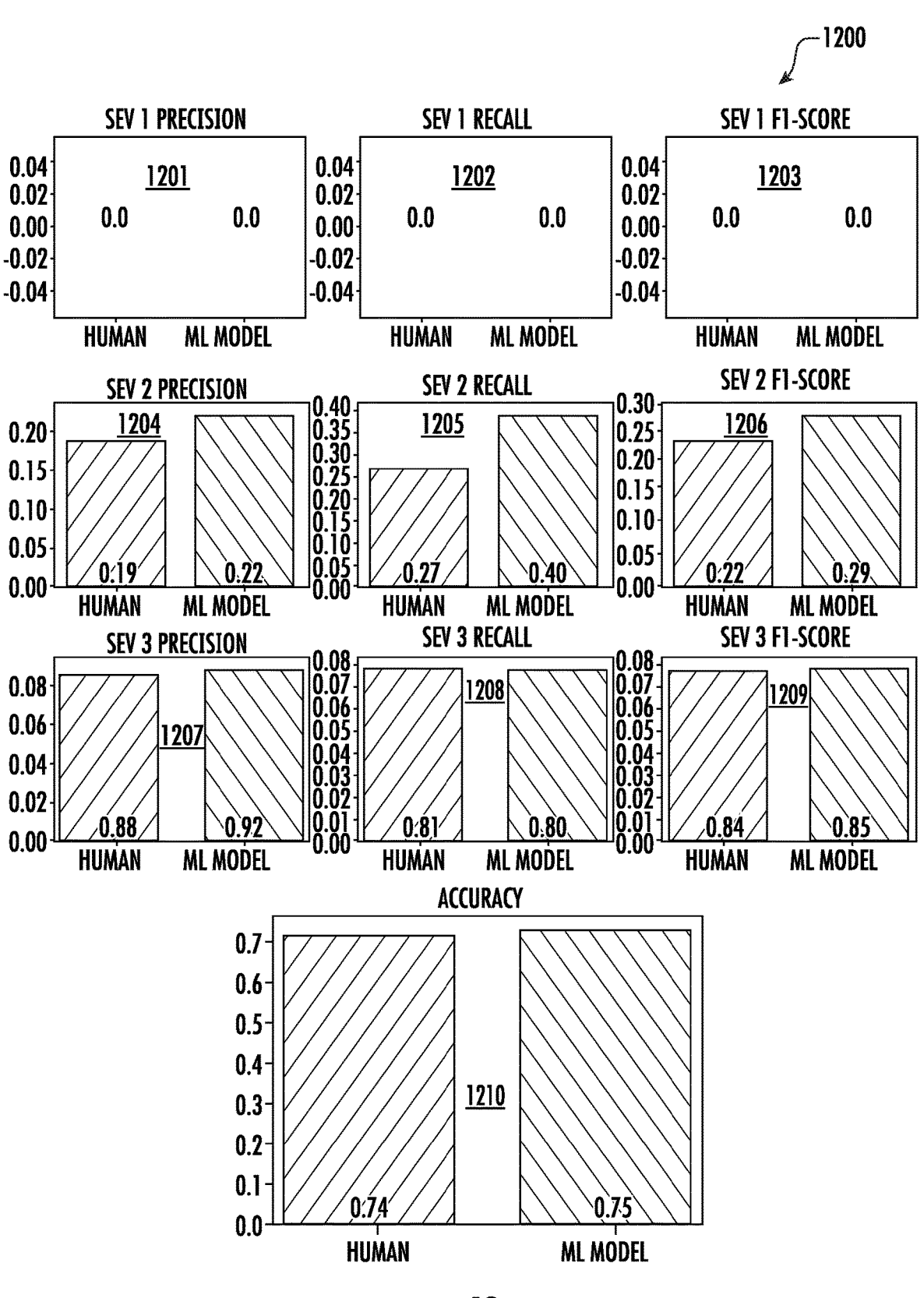

FIG. 12 provides an operational example of a user interface that displays an incident signature with recall rates, precision rates, and $F_1$ rates for subsets of software incident data objects that are categorized based on predicted incident severity levels and human-generated incident severity levels in accordance with at least some embodiments of the present invention.

FIG. 13 provides an operational example of a user interface that enables an end user to generate a software incident data object in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical problems associated with efficiently and reliably performing predictive monitoring of complex software application frameworks. The disclosed techniques can be utilized by a software monitoring data management system to generate predictive insights that enhance effectiveness and efficiency of performing software application framework monitoring with respect to complex software application frameworks. An example of such a software monitoring data management system is the Opsgenie® incident management system provided by Atlassian PTY LTD, which enables the collection of software incident data objects for various complex software application frameworks.

A complex software application framework is typically characterized by large networks of interdependent services and microservices that support a myriad of software features and applications. Indeed, some large complex software application frameworks may be comprised of topologies of 1,500 or more interdependent services and microservices.

Such complex software application frameworks are nimble, highly configurable, and enable robust collaboration and communication between users at individual levels, team levels, and enterprise levels.

Complex software application frameworks typically include large numbers of software applications. Each software application includes a number of features, with many features (e.g., user authentication features) shared between multiple software applications. Other features are supported only by one associated software application or a defined subset of software applications.

A given complex software application framework could support hundreds of software applications and hundreds of thousands of features. Those applications and features could be supported by thousands of services and microservices that exist in vast and ever-changing interdependent layers. Adding to this complexity is the fact that at any given time, a great number of software development teams may be constantly, yet unexpectedly, releasing code updates that change various software services, launch new software services, change existing features of existing software applications, add new software applications, add new features to existing software applications, and/or the like.

Individual software applications or software services may be configured to generate software incident data objects (e.g., software incident alerts) that describe a maintenance-critical state of the software applications or software services. Because of the numerosity of the software applications/services that are hosted by a complex software application framework, a large number of software incident data objects may be generated at any selected time interval. This creates a need for determining which software incident data objects should be operationally prioritized.

In some embodiments, without generating predictive insights about predicted incident severity levels software incident data objects, a software monitoring data management system will be forced to assess the relevance of software incident data objects individually, which results in the need for performing additional processing operations and using unnecessary computational resources. This problem is amplified as the number of software applications, features, or services in a complex software application framework grows larger, which in turn leads to data processing problems associated with real-time processing of a large number of software incident data objects.

As the foregoing description will illustrate, a software monitoring approach that relies exclusively on individual processing of all software incident data objects generated by software applications and software application services is not scalable and suffers from many efficiency and reliability drawbacks. It immediately becomes highly inefficient to process software incident data objects on an individual level as the complex software application frameworks grow and dynamically change.

To address the above-described challenges related to monitoring complex software application frameworks, various embodiments of the present invention describe techniques for generating incident signatures for a complex software application framework that are determined based on predicted incident severity levels for software incident data objects. These predicted incident severity levels may be generated by various machine learning techniques in order to generate effective incident signatures for a software application framework. By using the described techniques, various embodiments of the present invention generate predictive insights about severity levels of software incident data objects that can be used to increase efficiency and effectiveness of software application and software service monitoring. In doing so, various embodiments of the present invention make substantial technical contributions to improving the efficiency and the effectiveness of monitoring complex software application frameworks.

Various embodiments of the present invention enable faster processing of software incident data objects by generating reliable predicted incident severity levels for the noted software incident data objects and using the predicted incident severity levels to direct the software incident data objects to appropriate cohorts of incident resolution agents. In some embodiments, different cohorts of incident resolution agents are better equipped to deal with software incident data objects of different incident severity levels, with only a limited subset of the noted incident resolution agents being able to resolve software incidents that relate to software incident data objects have higher incident severity levels. By generating reliable predicted incident severity levels for the noted software incident data objects and using the predicted incident severity levels to direct the software incident data objects to appropriate cohorts of incident resolution agents, various embodiments of the present invention enable better utilization of incident resolution resources and faster average resolution time across a software application framework. In doing so, various embodiments of the present invention make important technical contributions to maintaining operational integrity of software application frameworks.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a server. The server is often (but not always) on another computer system, in which case the client accesses the service by way of a network. Client computing devices may include, without limitation, smart phones, tablet computers, laptop computers, wearables, personal computers, enterprise computers, and the like.

The term "server computing device" refers to a combination of computer hardware and/or software that is configured to provide a service to a client device. An example of a server computing device is the software monitoring data management computing device 106 of FIG. 1. In some embodiments, a server computing device communicates with one or more client computing devices using one or more computer networks.

The term "software incident data object" refers to a data object that is generated by a software application monitoring computing device and transmitted to a software monitoring data management computing device. The software incident data object is configured to describe one or more execution properties associated with execution of a software application framework being monitored by the software application monitoring computing device during a maintenance-critical state (e.g., a software failure state) of the software application framework. The software incident data object may include one or more natural language data fields that describe the above-noted execution properties using unstructured natural language data as well as one or more structured data fields that describe the execution properties using structured data, such as key-value pairs. Examples of software incident data objects include software incident alert data objects. Examples of natural language data fields of a software incident data object include a message data field of the software incident data object, such as the message field of a software incident data object in the Opsgenie® incident management platform. Examples of structured data fields of a software incident data object include a monitoring data object count for the software incident data object, an acknowledgement status for the software incident data object, a generation timestamp for the software incident data object, a monitoring data priority score for the software incident data object, and a visibility status for the software incident data object.

The term "natural language feature extraction machine learning model" refers to a data object that is maintained as part of the configuration data for a software monitoring data management computing device. The natural language feature extraction machine learning model describes parameters, hyper-parameters, and/or operations of a machine learning model that is configured to process natural language data fields of a software incident data object in order to generate a natural language feature data object for the software incident data object. While various embodiments of the present invention describe architectures in which the natural language processing operations of the natural language feature extraction machine learning model are executed locally on the software monitoring data management computing device, a person of ordinary skill in the relevant technology will recognize that, in some embodiments, the natural language processing operations of the natural language feature extraction machine learning model may be executed on a natural language processing server computing device that is remote from the software monitoring data management computing device. For example, in some embodiments, the operations of the natural language feature extraction machine learning model may cause the software monitoring data management computing device to transmit one or more application programming interface (API) calls to the natural language processing server computing device in order to cause the natural language processing server computing device to generate the natural language feature data object by performing one or more natural language processing operations on the natural language data fields of a software incident data object and transmit the natural language feature data object to the software monitoring data management computing device in response to the API calls. Examples of natural language feature extraction machine learning models include the Google Universal Sentence Encoder, a Bidirectional Encoder Representations from Transformers (BERT)-based model, a Robustly Optimized BERT Approach (ROBERTa) model, an encoder-decoder-based natural language processing model, and/or the like.

The term "natural language feature data object" refers to a data object that is generated by a software monitoring data management computing device through processing natural language data fields of a software incident data object using a natural language feature extraction machine learning model. In some embodiments, the natural language feature data object describes an n-dimensional vector, where the n value may be supplied as a hyper-parameter of the natural language feature extraction machine learning model. In some embodiments, the number and types of dimensions of the natural language feature data object is defined in accordance with a feature space, where the feature space may also characterize the number and types of dimensions of a structured data feature data object. An example of a natural language feature data object is the output of processing the message field of a software incident data object in the Opsgenie® incident management platform using a Google Universal Sentence Encoder model.

The term "structured data feature extraction machine learning model" refers to a data object that is maintained as part of the configuration data for a software monitoring data management computing device. The structured data feature extraction machine learning model describes parameters, hyper-parameters, and/or operations of a machine learning model that is configured to process structured data fields of a software incident data object in order to generate a structured data feature data object for the software incident data object. While various embodiments of the present invention describe architectures in which the structured data processing operations of the structured data feature extraction machine learning model are executed locally on the software monitoring data management computing device, a person of ordinary skill in the relevant technology will recognize that, in some embodiments, the structured data processing operations of the structured data feature extraction machine learning model may be executed on a structured data processing server computing device that is remote from the software monitoring data management computing device. For example, in some embodiments, the operations of the structured data feature extraction machine learning model may cause the software monitoring data management computing device to transmit one or more API calls to the structured data processing server computing device in order to cause the structured data processing server computing device to generate the structured data feature data object by performing one or more structured data processing operations on the structured data fields of a software incident data object and transmit the structured data feature data object to the software monitoring data management computing device in response to the API calls. Examples of structured data feature extraction machine learning models include a feedforward fully-connected neural network model, a recurrent neural network model, an adversarial neural network model, and/or the like.

The term "structured data feature data object" refers to a data object that is generated by a software monitoring data management computing device through processing structured data fields of a software incident data object using a structured data feature extraction machine learning model. In some embodiments, the structured data feature data object describes an n-dimensional vector, where the n value may be supplied as a hyper-parameter of the structured data feature extraction machine learning model. In some embodiments, the number and types of dimensions of the structured data feature data object is defined in accordance with a feature space, where the feature space may also characterize the number and types of dimensions of a natural language feature data object. An example of a structured data feature data object is the output of processing the timestamp field of a software incident data object in the Opsgenie® incident management platform using a feedforward fully-connected neural network model. In some embodiments, the set of structured features for an incident alert include the following: a faulty service feature for the incident alert, an affected products feature for the incident alert, an affected SLOs feature for the incident alert, a severity level feature for the incident alert, the ISD feature for the incident alert, the changes count feature for the incident alert, the social media platform feature for the incident alert, the videoconferencing platform feature for the incident alert, the time to resolution feature for the incident alert, the time to detect feature for the incident alert, the customer impact feature for the incident alert, the re-re-occurring incident feature for the incident alert, the exposed_externally feature for the incident alert, the support_ticket_count feature for the incident alert, the service_group feature for the incident alert, the status feature for the incident alert, the labels feature for the incident alert, one or more activity features for the incident alert, one or more incident analysis features for the incident alert, one or more date features for the incident alert, one or more text descriptions features for the incident alert, and/or the like.

The term "predicted severity level" refers to a data object that is generated by a software monitoring data management computing device and describes an inferred level of exposure/criticalness for a monitored event associated with a corresponding software incident data object. The inferred level of exposure/criticalness is determined using an incident severity level detection machine learning model. In some embodiments, the predicted severity level is determined based on a natural language feature data object for a corresponding software incident data object and a structured feature data object for the corresponding software incident data object. For example, the incident severity level detection machine learning model may be configured to process the natural language feature data object and the structured feature data object as inputs in order to generate outputs that comprise the predicted incident severity level. In some embodiments, the predicted incident severity level is a discrete classification output that is selected from a set of candidate classes (e.g., a set comprising a low predicted incident severity level class, a medium predicted incident severity level class, and a high predicted incident severity level class). In some embodiments, the predicted incident severity level is a continuous regression output (e.g., a value selected from the range 0-1). In some embodiments, the predicted incident severity level is a multi-valued output describing, for each candidate class of a set of candidate classes, a likelihood that the corresponding software incident data object is associated with the candidate class.

The term "incident severity level detection machine learning model" refers to a data object that is maintained as part of the configuration data for a software monitoring data management computing device. The structured data feature extraction machine learning model describes parameters, hyper-parameters, and/or operations of a machine learning model that is configured to process a structured feature data object for a software incident data object and a natural language feature data object for the software incident data object in order to generate a predicted incident severity level for the software incident data object. In some embodiments, the incident severity level detection machine learning model is a supervised trained machine learning model (e.g., a fully-connected supervised trained machine learning model).

The term "incident signature" refers to a data object that is generated by a software monitoring data management computing device and describes one or more inferred properties about an inferred cross-platform failure of a software application framework, where the one or more inferred properties are determined based on a predicted incident severity level that is identified by the software monitoring data management computing device. For example, the incident signature may describe that the software application framework is associated with n high-severity software incidents and m low-severity severity incidents. As another example, given that the software application framework is associated with n high-severity software incidents and m low-severity severity incidents, the incident signature for the software application framework may be associated based on the output of the equation $$\frac{n+m}{2}.$$

In some embodiments, an incident signature describes one or more predicted incident severity levels for one or more software incident data objects associated with a software application framework. In some embodiments, an incident signature describes precision rates, recall rates, and/or F-measures for sets of software incident data objects that are characterized by particular predicted incident severity levels and/or by particular human-generated incident severity levels. In some embodiments, an incident signature describes alert counts for sets of software incident data objects that are characterized by particular predicted incident severity levels and/or by particular human-generated incident severity levels.

The term "acknowledgement status" refers to a structured data field of a corresponding software incident data object that describes whether the corresponding software incident data object has been acknowledged by an administrator user profile. Accordingly, because the acknowledgement status is a data field of a corresponding software incident data object, the acknowledgement status is generated by a software application monitoring computing device and transmitted to a software monitoring data management computing device. An example of an acknowledgement status is the isAcknowledged field of the software incident data objects in the Opsgenie® incident management platform.

The term "view status" refers to a structured data field of a corresponding software incident data object that describes whether the corresponding software incident data object has been viewed by an administrator user profile. Accordingly, because the view status is a data field of a corresponding software incident data object, the view status is generated by a software application monitoring computing device and transmitted to a software monitoring data management computing device. An example of a view status is the isSeen field of the software incident data objects in the Opsgenie® incident management platform.

The term "generation timestamp" refers to a structured data field of a corresponding software incident data object that describes when the corresponding software incident data object was first generated by a software application monitoring computing device. Accordingly, because the generation timestamp is a data field of a corresponding software incident data object, the generation timestamp is generated by a software application monitoring computing device and transmitted to a software monitoring data management computing device. An example of a generation timestamp is the CreatedAt field of the software incident data objects in the Opsgenie® incident management platform.

The term "update timestamp" refers to a structured data field of a corresponding software incident data object that describes when the corresponding software incident data object was last updated by a software application monitoring computing device. Accordingly, because the update timestamp is a data field of a corresponding software incident data object, the update timestamp is generated by a software application monitoring computing device and transmitted to a software monitoring data management computing device. An example of an update timestamp is the UpdatedAt field of the software incident data objects in the Opsgenie® incident management platform.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
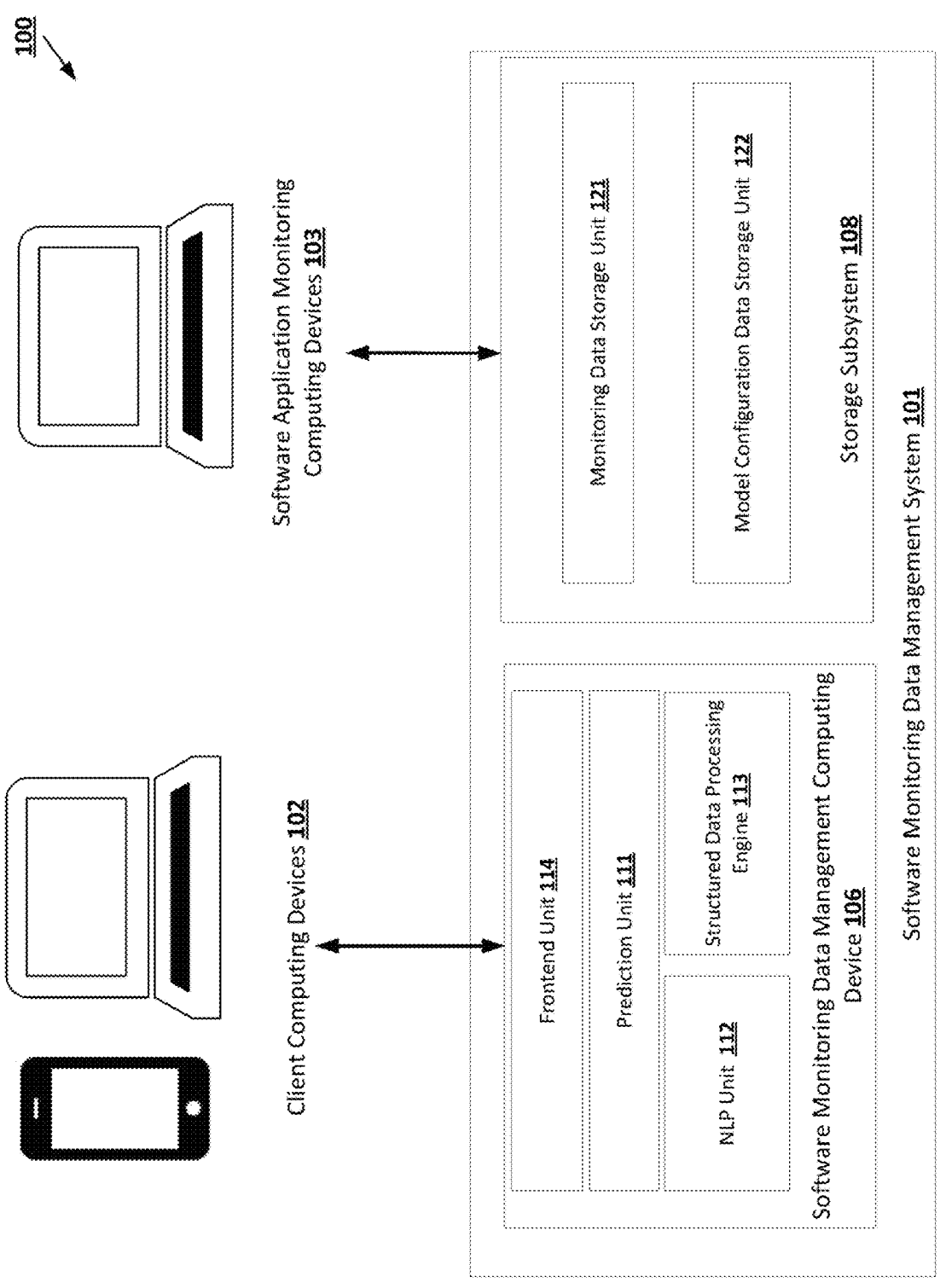
FIG. 1 is a block diagram of an example architecture within which at least some embodiments of the present invention may operate.

FIG. 1 depicts an exemplary architecture 100 for performing predictive monitoring of a software application framework that is associated with one or more software application monitoring computing devices 103. The architecture 100 includes one or more client computing devices 102, a software monitoring data management system 101, and the one or more software application monitoring computing devices 103.

The one or more software application monitoring computing devices 103 are configured to transmit software incident data objects to the software monitoring data management system 101, which the software monitoring data management system 101 may store in the monitoring data storage unit 121 in the storage subsystem 108 of the software monitoring data management system 101. The software monitoring data management computing device 106 may process the software incident data objects that are stored in the monitoring data storage unit 121 using the model configuration data that are stored in the model configuration data storage unit 122 in the storage subsystem 108 of the software monitoring data management system 101 in order to generate prediction outputs that are transmitted to the client computing devices 102 via a frontend unit 114 of the software monitoring data management computing device 106. To do so, the software monitoring data management computing device 106 may use a natural language processing unit 112, a prediction unit 111, and a structured data processing unit 113.

The natural language processing unit 112 may be configured to determine, based on one or more natural language data fields of a software incident data object for the software application framework and using a natural language processing machine learning framework, a natural language feature data object for the software incident data object. The structured data processing unit 113 may be configured to determine, based on one or more structured data fields of the software incident data object and using a structured data processing machine learning model, a structured data feature data object for the software incident data object. The prediction unit 111 may be configured to determine, based on the natural language feature data object and the structured data feature data object and using a feature combination machine learning model, a predicted incident severity level for the software incident data object.

The client computing devices 102, the software application monitoring computing devices 103, and the software monitoring data management computing device 106 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Websocket channel. In some embodiments, the protocol is JSON over RPC, JSON over REST/HTTP, and the like.

Exemplary Software Monitoring Data Management Computing Device

Figure 2:
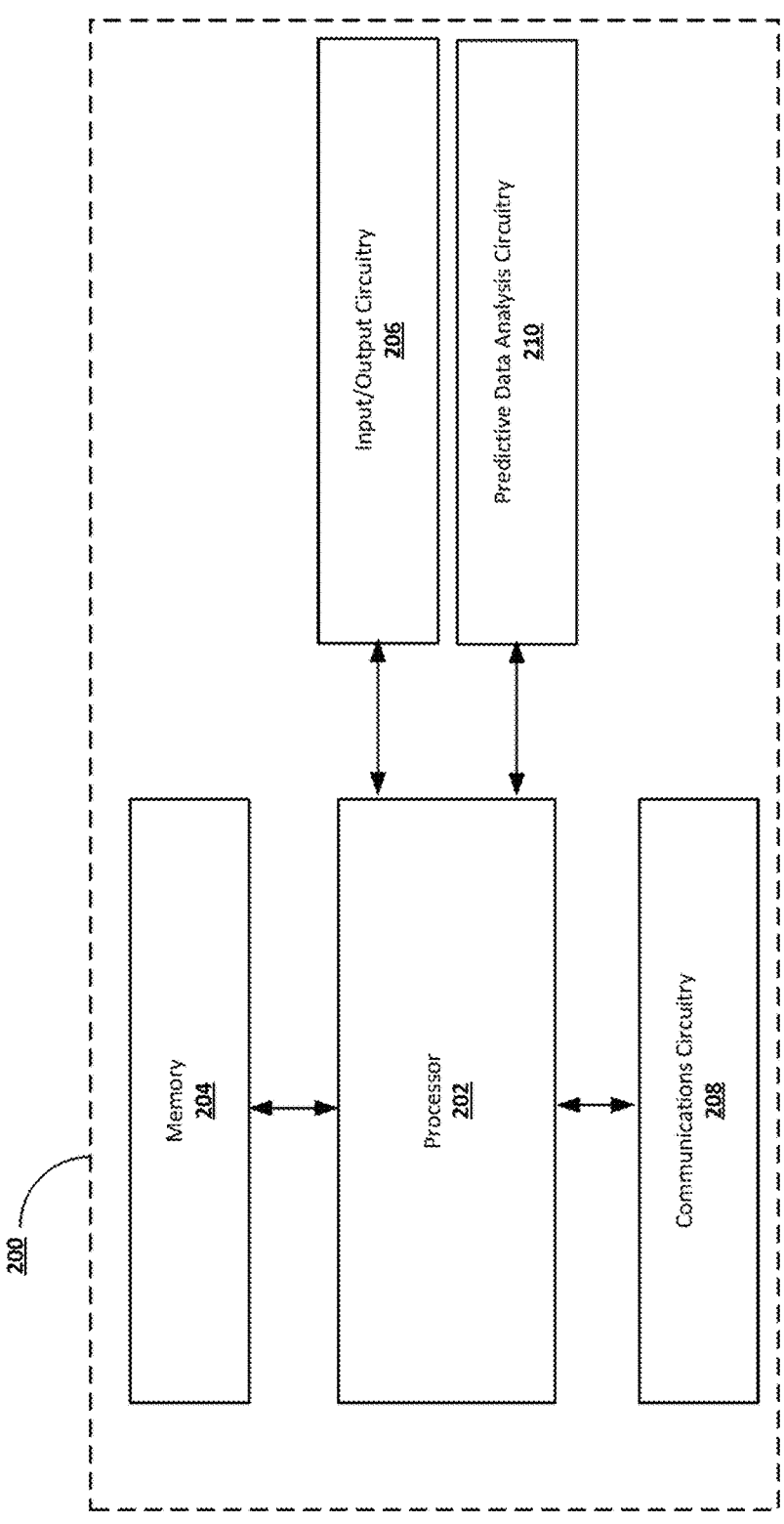
FIG. 2 is a block diagram of an example software monitoring data management computing device in accordance with at least some embodiments of the present invention.

The software monitoring data management computing device 106 may be embodied by one or more computing systems, such as apparatus 200 shown in FIG. 2. The apparatus 200 may include processor 202, memory 204, input/output circuitry 206, communications circuitry 208, and a predictive data analysis circuitry 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The predictive data analysis circuitry 210 may be any means such as a device or circuitry embodied in either hardware or a combination of hardware and software that is configured to perform predictive data analysis operations. For example, the predictive data analysis circuitry 210 may include specialized circuitry that are configured to perform machine learning operations in an expediated manner, such as graphical processing unit (GPU) circuitry and/or tensor processing unit (TPU) circuitry.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
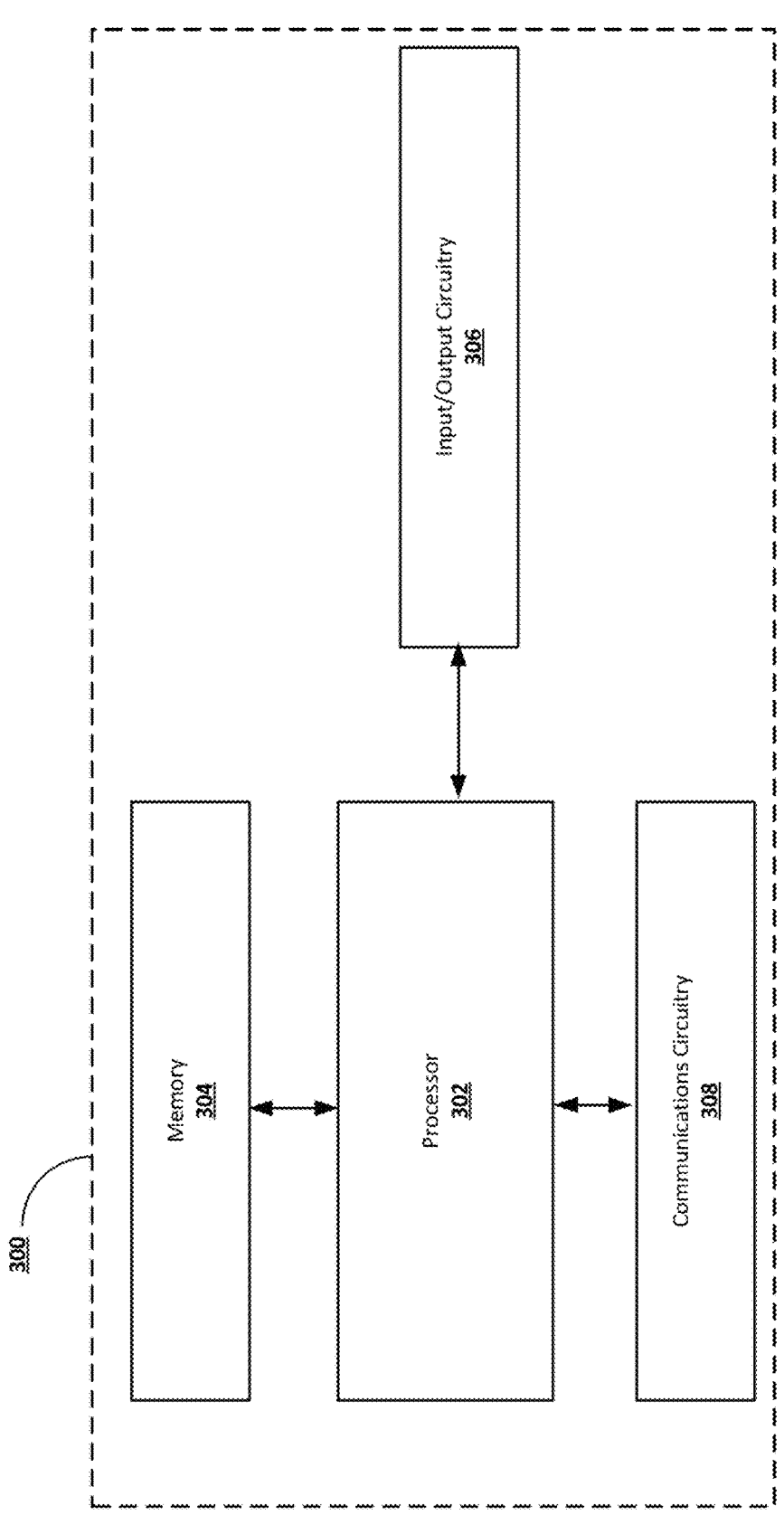
FIG. 3 is a block diagram of an example client computing device in accordance with at least some embodiments of the present invention.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Exemplary Software Application Monitoring Computing Device

Figure 4:
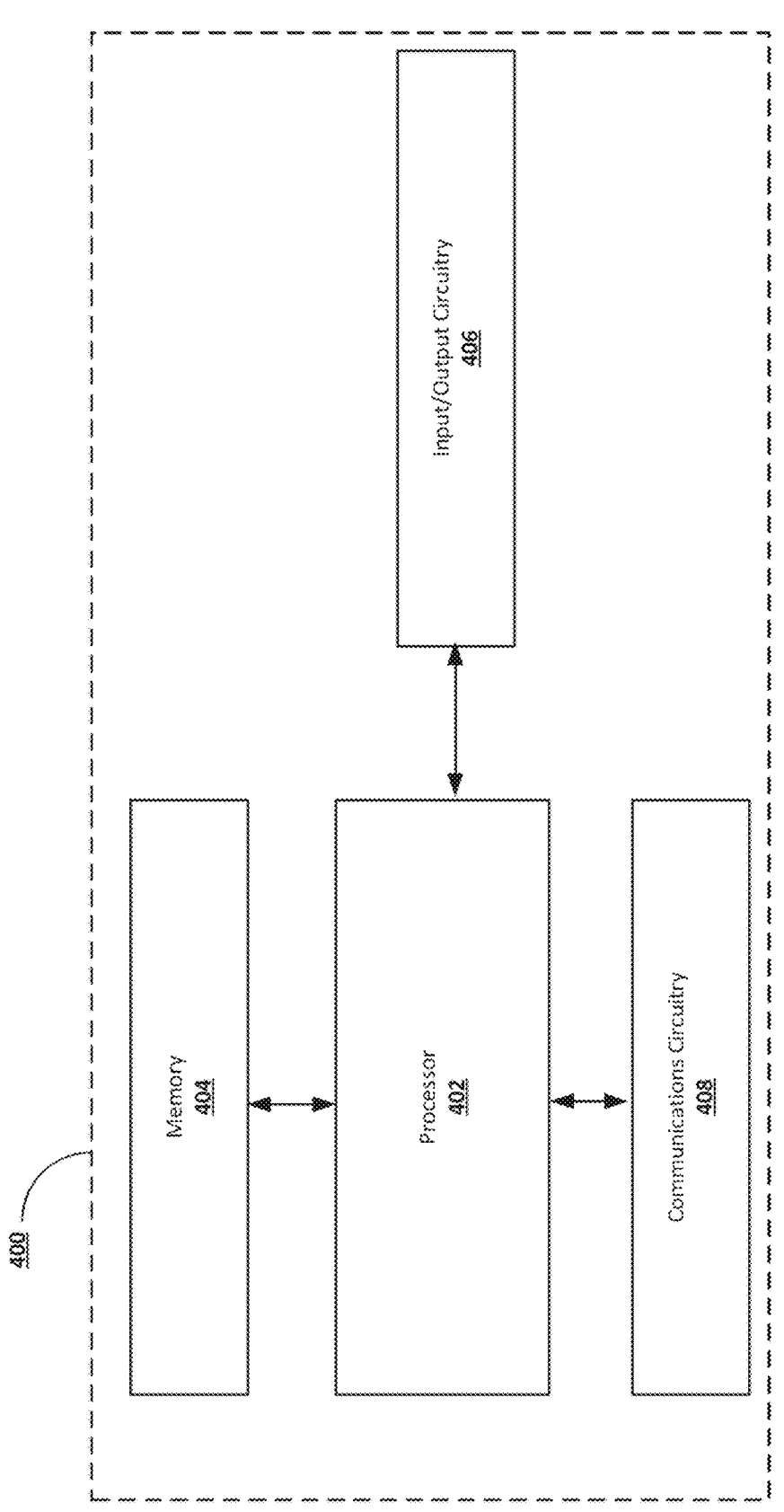
FIG. 4 is a block diagram of an example software application monitoring computing device in accordance with at least some embodiments of the present invention.

Referring now to FIG. 4, a software application monitoring computing device may be embodied by one or more computing systems, such as apparatus 400 shown in FIG. 4. The apparatus 400 may include processor 402, memory 404, input/output circuitry 406, and communications circuitry 408. Although these components 402-408 are described with respect to functional limitations, it should be understood that the particular implementations necessarily include the use of particular hardware. It should also be understood that certain of these components 402-408 may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may include one or more databases. Furthermore, the memory 404 may be configured to store information, data, content, applications, instructions, or the like for enabling the apparatus 400 to carry out various functions in accordance with example embodiments of the present invention.

The processor 402 may be embodied in a number of different ways and may, for example, include one or more processing devices configured to perform independently. In some preferred and non-limiting embodiments, the processor 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present invention while configured accordingly. Alternatively, as another example, when the processor 402 is embodied as an executor of software instructions (e.g., computer program instructions), the instructions may specifically configure the processor 402 to perform the algorithms and/or operations described herein when the instructions are executed.

In some embodiments, the apparatus 400 may include input/output circuitry 406 that may, in turn, be in communication with processor 402 to provide output to the user and, in some embodiments, to receive an indication of a user input. The input/output circuitry 406 may comprise a user interface and may include a display, and may comprise a web user interface, a mobile application, a query-initiating computing device, a kiosk, or the like.

In embodiments in which the apparatus 400 is embodied by a limited interaction device, the input/output circuitry 406 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 406 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 404, and/or the like).

The communications circuitry 408 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 408 may include, for example, a network interface for enabling communications with a wired or wireless communication network. For example, the communications circuitry 408 may include one or more network interface cards, antennae, buses, switches, routers, modems, and supporting hardware and/or software, or any other device suitable for enabling communications via a network. Additionally or alternatively, the communications circuitry 408 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

Example Data Flows and Operations

FIG. 5 is a flowchart diagram of an example process 500 for predictive monitoring of a software application framework. Via the various operations of the process 500, the software monitoring data management computing device 106 can utilize a machine learning framework to efficiently and reliably generate incident signatures for the software application framework based on predicted incident severity levels for software incident data objects.

The process 500 begins at operation 501 when the software monitoring data management computing device 106 identifies a software incident data object for the software application framework. For example, the software monitoring data management computing device 106 may receive the software monitoring data management computing device 106 from one of the software application monitoring computing devices 103. An example of a software monitoring computing device is a data object that describes a recorded/monitored software incident data object for a software incident associated with the software application framework.

The software incident data object may in some embodiments be configured to describe one or more execution properties associated with execution of the software application framework being monitored by a software application monitoring computing device 103 during a maintenance-critical state (e.g., a software failure state) of the software application framework. In some embodiments, a software incident data object may describe that a failure of a particular software application of a multi-application software application framework has been recorded at a particular time.

For example, the software incident data object may describe that the software application framework has been recorded to have experienced a network outage. As another example, the software incident data object may describe that the software application framework has been recorded to have experienced a processor saturation. As yet another example, the software incident data object may describe that the software application framework has been recorded to have experienced a process crash. As a further example, the software incident data object may describe that a user-reported incident has been received in relation to the operation of the software application framework and by an end user of the software application framework.

FIG. 6 depicts an operational example of a software monitoring data display user interface 600 that includes user interface segments 611-615 that each describe various properties of a corresponding software incident data object. As further depicted in FIG. 6, because of the selection of the user interface element 601, the software monitoring data display user interface 600 currently displays information about "open" (i.e., unresolved) software incident data objects. User interface segments 611-615 are described in greater detail below, in relation to describing exemplary data fields of a software incident data object.

The software incident data object may describe one or more data fields that describe one or more execution properties of a monitored event associated with the software application framework. For example, the software incident data object may include one or more natural language data fields that describe the above-noted execution properties using unstructured natural language data as well as one or more structured data fields that describe the execution properties using structured data, such as key-value pairs. Examples of software incident data objects include software incident data object data objects. Examples of natural language data fields of a software incident data object include a message data field of the software incident data object, such as the message field of a software incident data object in the Opsgenie® incident management platform. Examples of structured data fields of a software incident data object include a monitoring data object count for the software incident data object, an acknowledgement status for the software incident data object, a generation timestamp for the software incident data object, a monitoring data priority score for the software incident data object, and a visibility status for the software incident data object.

A natural language data field of a software incident data object describes execution properties of a monitored event associated with the software incident data object as unstructured data. For example, as depicted in FIG. 6, the natural language data field of the user interface segment 611 describes that the corresponding software incident data object is associated with the natural language data "APPLICATION Problem 979: Web check global outage"; the natural language data field of the user interface segment 612 describes that the corresponding software incident data object is associated with the natural language data "OPEN Problem 646: Process crashed"; the natural language data field of the user interface segment 613 describes that the corresponding software incident data object is associated with the natural language data "OPEN Problem 534: Process crashed"; the natural language data field of the user interface segment 614 describes that the corresponding software incident data object is associated with the natural language data "OPEN Problem 186: CPU saturation"; and the natural language data field of the user interface segment 615 describes that the corresponding software incident data object is associated with the natural language data "OPEN Problem 814: Process crashed".

Examples of natural language data field of a software incident data object include an the ISD feature for the software incident data object, the changes count feature for the software incident data object, a social media platform feature for the software incident data object, and/or the like. In some embodiments, the ISD features describes one or more incident state documents (ISDs) associated with a software incident data object. In some embodiments, the ISD feature contains a link to the one or more ISDs associated with the software incident data object. In some embodiments, the social media platform feature describes one or more social media platform pages associated with a software incident data object. In some embodiments, the social media platform feature describes a link to each social media platform page (e.g., Slack room) associated with a software incident data object.

A structured data field of a software incident data object describe execution properties of a monitored event associated with the software incident data object as structured data, such as a key-value pairs. Examples of structured data fields for a software incident data object include a monitoring data object count for the software incident data object, a generation timestamp for the software incident data object, an update timestamp for the software incident data object, a monitoring data priority score for the software incident data object, a view status for the software incident data object, an acknowledgement status for the software incident data object, and a resolution status for the software incident data object.

The incident data object count for a software incident data object describes a count of software incident data objects that are deemed to be associated with a common monitored event for the corresponding software incident data object. In some embodiments, a software application monitoring computing device 103 that transmits software incident data objects to the software monitoring data management computing device 106 performs an initial grouping of the transmitted software incident data objects. In some of those embodiments, the monitoring object data count for a software incident data object describes a count of the software incident data objects that are within the initial grouping of the corresponding software incident data object. An example of an monitoring data object count field is the count field of the software incident data objects in the Opsgenie® incident management platform.

The monitoring data priority score for a software incident data object describes an assigned relative urgency level for the corresponding software incident data object. In some embodiments, a software application monitoring computing device 103 that transmits software incident data objects to the software monitoring data management computing device 106 performs an initial priority scoring of the transmitted software incident data objects, which are then used to generate the monitoring data priority scores for the software incident data objects. An example of a monitoring data priority score is the priority field of the software incident data objects in the Opsgenie® incident management platform.

The generation timestamp for a software incident data object describes when the corresponding software incident data object was first generated by the software application monitoring computing device 103. For example, as depicted in FIG. 6, the user interface segment 611 describes that the corresponding software incident data object is associated with a generation timestamp of Apr. 29, 2016 at 8:08 AM;

the user interface segment 612 describes that the corresponding software incident data object is associated with a generation timestamp of Apr. 16, 2016 at 4:30 PM; the user interface segment 613 describes that the corresponding software incident data object is associated with a generation timestamp of Apr. 15, 2016 at 10:03 PM; the user interface segment 614 describes that the corresponding software incident data object is associated with a generation timestamp of Apr. 14, 2016 at 1:54 PM; and the user interface segment 615 describes that the corresponding software incident data object is associated with a generation timestamp of Apr. 14, 2016 at 12:32 PM. An example of a generation timestamp is the CreatedAt field of the software incident data objects in the Opsgenie® incident management platform.

The update timestamp for a software incident data object describes when the corresponding software incident data object was last updated by a software application monitoring computing device 103. In some embodiments, the software monitoring data management computing device 106 enables a software application monitoring computing device 103 to update the data fields of a software incident data object after initially transmitting the software incident data object. In some of the noted embodiments, the software monitoring data management computing device 106 records the latest update timestamp for a software incident data object as a structured data field of the software incident data object. An example of an update timestamp is the UpdatedAt field of the software incident data objects in the Opsgenie® incident management platform.

The view status for a software incident data object describes whether the corresponding software incident data object has been viewed by an administrator user profile of the software application monitoring computing device 103. In some embodiments, the view status for a software incident data object is generated based on tracking the user activity data of an administrator user profile, which may for example be performed by at least one of a software application monitoring computing device 103 and the software monitoring data management computing device 106. An example of a view status is the isSeen field of the software incident data objects in the Opsgenie® incident management platform.

The acknowledgement status for the software incident data object describes whether the corresponding software incident data object has been acknowledged by an administrator user profile of the software application monitoring computing device 103. For example, as depicted in FIG. 6, the user interface segment 611 describes that the corresponding software incident data object has a negative acknowledgement status describing a lack of acknowledgement of the corresponding software incident data object, the user interface segment 612 describes that the corresponding software incident data object has a negative acknowledgement status describing a lack of acknowledgement of the corresponding software incident data object, the user interface segment 613 describes that the corresponding software incident data object has a negative acknowledgement status describing a lack of acknowledgement of the corresponding software incident data object, the user interface segment 614 describes that the corresponding software incident data object has a negative acknowledgement status describing a lack of acknowledgement of the corresponding software incident data object, and the user interface segment 615 describes that the corresponding software incident data object has a negative acknowledgement status describing a lack of acknowledgement of the corresponding software incident data object. An example of an acknowledgement status is the isAcknowledged field of the software incident data objects in the Opsgenie® incident management platform.

The resolution status of a corresponding software incident data object describes whether the corresponding software incident data object has been resolved by an administrator user profile. For example, as depicted in FIG. 6, the user interface segment 611 depicts that the corresponding software incident data object has a negative resolution status describing an open resolution status, the user interface segment 612 depicts that the corresponding software incident data object has a negative resolution status describing an open resolution status, the user interface segment 613 depicts that the corresponding software incident data object has a negative resolution status describing an open resolution status, the user interface segment 614 depicts that the corresponding software incident data object has a negative resolution status describing an open resolution status, and the user interface segment 615 depicts that the corresponding software incident data object has a negative resolution status describing an open resolution status.

In some embodiments, the one or more structured data fields for a software incident data object include a window-adjusted timestamp for the software incident data object, where the window-adjusted timestamp is determined based on a sliding window for the software incident data object, and the sliding window comprises a predefined number of temporally adjacent software incident data objects for the software incident data object. The window-adjusted timestamp for the software incident data object may be generated by the software monitoring data management computing device 106 by adjusting the update timestamp of a corresponding software incident data object based on a statistical distribution measure of the generation timestamps of the software incident data objects that fall within a sliding window of the corresponding software incident data object. In some embodiments, by processing temporally adjacent software incident data objects for a particular software incident data object, the software monitoring data management computing device 106 learns patterns or the sequence of software incident data objects. For example, with respect to database-outage-related alerts, the software monitoring data management computing device 106 may learn where such alerts usually originate from, where they are propagated, and which software applications and/or software application services of a software application framework are usually affected by incidences related to those alerts.

For example, in some embodiments, the software monitoring data management computing device 106 may generate a window-adjusted timestamp for a corresponding software incident data object by: (i) identifying a predefined number of (e.g., five) software incident data objects that occur within a sliding window of the corresponding software incident data object (e.g., a sliding window that includes the corresponding software incident data object, two software incident data objects whose generation timestamps immediately precede the generation timestamp of the corresponding software incident data object, and two software incident data objects whose generation timestamps immediately succeed the generation timestamp of the corresponding software incident data object), (ii) calculating the mean of the update timestamps of the five software incident data objects, and (iii) generating the window-adjusted timestamp based on the calculated mean.

As another example, in some embodiments, the software monitoring data management computing device 106 may generate a window-adjusted timestamp for a corresponding software incident data object by: (i) identifying a predefined number of (e.g., five) software incident data objects that occur within a sliding window of the corresponding software incident data object, (ii) calculating the median of the update timestamps of the five software incident data objects, and (iii) generating the window-adjusted timestamp based on the calculated median.

An operational example of a software incident data object 701 is depicted in FIG. 7. As depicted in FIG. 7, the software incident data object 701 is associated with the acknowledgement status 711, the view status 712, the monitoring data object count 713, the monitoring data priority score 714, the natural language data field 715, the object identifier 716, the owner identifier 717, the team identifier 718, the alias 719, the generation timestamp 720, the update timestamp 721, the resolution status 722, the last occurrence timestamp 723, the snooze timestamp 724, and the snooze status 725.

In some embodiments, the set of structured data fields for a software incident data object include the following: a faulty service feature for the software incident data object, an affected products feature for the software incident data object, an affected SLOs feature for the software incident data object, a severity level feature for the software incident data object, the videoconferencing platform feature for the software incident data object, the time to resolution feature for the software incident data object, the time to detect feature for the software incident data object, the customer impact feature for the software incident data object, the re-re-occurring incident feature for the software incident data object, the exposed_externally feature for the software incident data object, the support_ticket_count feature for the software incident data object, the status feature for the software incident data object, the labels feature for the software incident data object, one or more activity features for the software incident data object, one or more incident analysis features for the software incident data object, one or more date features for the software incident data object, one or more text descriptions features for the software incident data object, and/or the like. The noted exemplary structured data fields are described in greater detail below.

In some embodiments, the faulty service feature describes a service component associated with a corresponding software incident data object. In some embodiments, the faulty service feature describes an affected service component associated with a corresponding software incident data object.

In some embodiments, the affected products feature describes one or more product components associated with a corresponding software incident data object. In some embodiments, the affected products feature describes one or more products that are deemed to be affected by a corresponding software incident data object.

In some embodiments, the affected SLOs feature describes one or more service level objective (SLO) components associated with a corresponding software incident data object. In some embodiments, the affected products feature describes one or more SLOs that are deemed to be affected by a corresponding software incident data object.

In some embodiments, the severity level feature describes a user-assigned severity level of a software incident data object. In some embodiments, the severity level feature may have one of four values: Minor, Major, Critical, and Crisis.

In some embodiments, the changes count feature describes a count of one or more changes to a software incident data object, e.g., a count of changes to a software incident data object in one or more platforms such as at least one of Socrates or Splunk.

In some embodiments, the corrective action feature describes one or more features associated with one or more corrective actions undertaken in response to the incident described by the software incident data object. In some embodiments, for each corrective action, the corrective action describes at least one of a corrective action type and/or a corrective action success. In some embodiments, the corrective action feature describes a count of corrective actions undertaken in response to the incident described by the software incident data object.

In some embodiments, the videoconferencing media platform feature describes one or more videoconferencing platform pages associated with a software incident data object. In some embodiments, the videoconferencing platform feature describes a link to each videoconferencing platform page (e.g., Zoom room) associated with a software incident data object.

In some embodiments, the Time to Resolution feature describes an estimated time between occurrence of an incident to a resolution of the incident, where the incident is associated with a corresponding software incident data object. In some embodiments, the Time to Detect feature describes an estimated time between occurrence of an incident to a detection of the incident, where the incident is associated with a corresponding software incident data object.

In some embodiments, the customer impact feature describes which customers a corresponding software incident data object has affected. In some embodiments, the customer impact feature can take one of three values: External, Internal, and Unknown.

In some embodiments, the rre-occurring incident feature describes whether a software incident data object is associated with an incident having an incident type that has been observed to occur before. In some embodiments, the re-occurring incident feature is a Boolean feature.

In some embodiments, the exposed_externally feature describes whether a software incident data object is deemed to have exposed an institution to external actors. In some embodiments, the exposed_externally feature is a Boolean feature.

In some embodiments, the support ticket feature describes a count of support tickets associated with a software incident data object. In some embodiments, the support ticket feature is extracted from an analytics bot of an analytics engine.

In some embodiments, the status feature describes a current status of an incident that is associated with a software incident data object. In some embodiments, the status feature can take one of four values: Pending, Fixing, Closed, and Rejected.

In some embodiments, the Labels feature describes one or more text labels of a software incident data object. In some embodiments, the Labels feature is an array of strings. In some embodiments, the Labels feature is a linked list of strings. In general, the Labels feature may include a collection of strings each associated with a text label.

In some embodiments, the activity features describe one or more user activities on a software incident data object reporting platform that are performed with respect to a corresponding software incident data object. In some embodiments, the activity features describes at least one of user comments for a software incident data object, user work logs for a software incident data object, user action histories for a software incident data object, user activity histories for a software incident data object, and status changes for a software incident data object.

In some embodiments, the incident analysis features describe one or more analysis features for a software incident data object, including a root cause category, a feature describing whether the incident was detected by monitoring, and/or the like. In some embodiments, the root cause category feature may take one of the following values: Change, Dependency, Scale, Architecture, Bug, Unknown.

In some embodiments, the date features describes one or more durations that are determined based on timestamps associated with a software incident data object, such as at least one of a creation timestamp associated with a software incident data object, any modification timestamps associated with a software incident data object, any resolution timestamps associated with a software incident data object, any transition timestamps associated with a software incident data object, and/or the like. For example, a data feature may describe a time to resolution duration that is calculated based on a measure of deviation between an impact end timestamp and an impact start timestamp for a software incident data object.

In some embodiments, the one or more structured data fields for a software incident data object comprise a structured data field describing whether a software incident corresponding to the software incident data object has been recorded to have been exposed to one or more external users of the software system. In some embodiments, the one or more structured data fields comprise a structured data field describing an affected subset of a plurality of defined subsystems of the software system for the software incident data object. In some embodiments, the one or more structured data fields comprise a structured data field describing a count of software system support tickets corresponding to the software incident data object. In some embodiments, the one or more structured data fields comprise a structured data field describing an estimated resolution duration for the software incident data object. In some embodiments, the one or more structured data fields comprise a structured data field describing an estimated detection duration for the software incident data object. In some embodiments, the one or more structured data fields comprise a structured data field describing an estimated tenant set for the software incident data object. In some embodiments, the one or more structured data fields comprise a structured data field describing one or more user-defined labels for the software incident data object. In some embodiments, the one or more structured data fields comprise one or more incident analysis features for an incident alert that is associated with the software incident data object. In some embodiments, the one or more incident analysis features comprise an inferred incident category feature. In some embodiments, the one or more structured data fields comprise a structured data field describing a creation timestamp for the software incident data object. In some embodiments, the one or more structured data fields of a software incident data object is a service tier for the software incident data object that describes a categorical designation of an operational criticalness of a service that is affected a software incident described by the software incident data object.

In some embodiments, the one or more structured data fields for a software incident data object comprise a structured data field describing a resolution timestamp for the software incident data object. In some embodiments, the one or more structured data fields comprise a structured data field describing one or more agent resolution timestamps for the software incident data object.

In some embodiments, a software incident data object is generated by structured data fields and/or natural language data fields provided by an end user of a client computing device 102 that is interacting with the software monitoring data management system 101. FIG. 13 provides an operational example of a user interface 1300 that may be used by an end user to generate a software incident data object. As depicted in FIG. 13, the data fields that may be provided by the end user in relation to a software incident data object include a summary data field (that is entered using the user interface element 1301), a description data field (that is entered using the user interface element 1302), a human-generated incident severity level field (that is entered using the user interface element 1303), a faulty service field (that is entered using the user interface element 1304), an affected product field (that is entered using the user interface element 1305), and one or more attachment document fields (that are selected using the user interface element 1306).

At operation 502, the software monitoring data management computing device 106 determines a predicted incident severity level for the software incident data object. The predicted severity level for a software incident data object describes an inferred level of exposure/criticalness for a monitored event associated with the software incident data object. The inferred level of exposure/criticalness is determined using an incident severity level detection machine learning model. In some embodiments, the predicted severity level is determined based on a natural language feature data object for a corresponding software incident data object and a structured feature data object for the corresponding software incident data object. For example, the incident severity level detection machine learning model may be configured to process the natural language feature data object and the structured feature data object as inputs in order to generate outputs that comprise the predicted incident severity level. In some embodiments, the predicted incident severity level is a discrete classification output that is selected from a set of candidate classes (e.g., a set comprising a low predicted incident severity level class, a medium predicted incident severity level class, and a high predicted incident severity level class). In some embodiments, the predicted incident severity level is a continuous regression output (e.g., a value selected from the range 0-1). In some embodiments, the predicted incident severity level is a multi-valued output describing, for each candidate class of a set of candidate classes, a likelihood that the corresponding software incident data object is associated with the candidate class.

In some embodiments, operation 502 is performed in accordance with the process that is depicted in FIG. 8. The process that is depicted in FIG. 8 begins at operation 801 when the software monitoring data management computing device 106 determines, based on one or more natural language data fields of the software incident data object and using a natural language processing machine learning framework, a natural language feature data object for the software incident data object. For example, the software monitoring data management computing device 106 may process the message field of a software incident data object using a sentence encoder machine learning model to generate a natural language embedding of the software incident data object.

The natural language processing machine learning framework is configured to process natural language data fields of a software incident data object (e.g., a message field of the software incident data object) in order to generate a natural language feature data object for the software incident data object. While various embodiments of the present invention describe architectures in which the natural language processing operations of the natural language processing machine learning framework are executed locally on the software monitoring data management computing device, a person of ordinary skill in the relevant technology will recognize that, in some embodiments, the natural language processing operations of the natural language processing machine learning framework may be executed on a natural language processing server computing device that is remote from the software monitoring data management computing device.

For example, in some embodiments, the operations of the natural language processing machine learning framework may cause the software monitoring data management computing device to transmit one or more application programming interface (API) calls to the natural language processing server computing device in order to cause the natural language processing server computing device to generate the natural language feature data object by performing one or more natural language processing operations on the natural language data fields of a software incident data object and transmit the natural language feature data object to the software monitoring data management computing device in response to the API calls. Examples of natural language processing machine learning frameworks include the Google Universal Sentence Encoder, a Bidirectional Encoder Representations from Transformers (BERT)-based model, an encoder-decoder-based natural language processing model, and/or the like.

Accordingly, the natural language feature embedding is generated by software monitoring data management computing device 106 through processing natural language data fields of a software incident data object using a natural language processing machine learning framework. In some embodiments, the natural language feature data object describes an n-dimensional vector, where the n value may be supplied as a hyper-parameter of the natural language processing machine learning framework. In some embodiments, the number and types of dimensions of the natural language feature data object is defined in accordance with a feature space, where the feature space may also characterize the number and types of dimensions of a structured data feature data object. An example of a natural language feature data object is the output of processing the message field of a software incident data object in the Opsgenie® incident management platform using a Google Universal Sentence Encoder model.

At operation 802, the software monitoring data management computing device 106 determines, based on one or more structured data fields of the software incident data object and using a structured data processing machine learning model, a structured data feature data object for the software incident data object. For example, the software monitoring data management computing device 106 may process the generation timestamp, the acknowledgement status, and the monitoring data object count of a software incident data object using a machine learning model to generate a structured data embedding of the noted structured data features of the software incident data object.

The structured data processing machine learning model is configured to process structured data fields of a software incident data object in order to generate a structured data feature data object for the software incident data object. While various embodiments of the present invention describe architectures in which the structured data processing operations of the structured data processing machine learning model are executed locally on the software monitoring data management computing device, a person of ordinary skill in the relevant technology will recognize that, in some embodiments, the structured data processing operations of the structured data processing machine learning model may be executed on a structured data processing server computing device that is remote from the software monitoring data management computing device.

For example, in some embodiments, the operations of the structured data processing machine learning model may cause the software monitoring data management computing device to transmit one or more API calls to the structured data processing server computing device in order to cause the structured data processing server computing device to generate the structured data feature data object by performing one or more structured data processing operations on the structured data fields of a software incident data object and transmit the structured data feature data object to the software monitoring data management computing device in response to the API calls. Examples of structured data processing machine learning models include a feedforward fully-connected neural network model, a recurrent neural network model, an adversarial neural network model, and/or the like.

Accordingly, the structured data feature data object is generated by the software monitoring data management computing device 106 through processing structured data fields of a software incident data object using a structured data processing machine learning model. In some embodiments, the structured data feature data object describes an n-dimensional vector, where the n value may be supplied as a hyper-parameter of the structured data processing machine learning model. In some embodiments, the number and types of dimensions of the structured data feature data object is defined in accordance with a feature space, where the feature space may also characterize the number and types of dimensions of a natural language feature data object. An example of a structured data feature data object is the output of processing the time to resolution field of a software incident data object in the Opsgenie® incident management platform using a feedforward fully-connected neural network model.

At operation 803, the software monitoring data management computing device 106 determines, based on the natural language feature data object and the structured data feature data object and using an incident severity level detection machine learning model, the predicted incident severity level for the software incident data object. The incident severity level detection machine learning model is configured to process a structured feature data object for a software incident data object and a natural language feature data object for the software incident data object in order to generate a predicted incident severity level for the software incident data object. In some embodiments, the incident severity level detection machine learning model is a supervised trained machine learning model.

Returning to FIG. 5, at operation 503, the software monitoring data management computing device 106 determines one or more incident signatures for the software application framework based on the predicted incident severity. For example, an incident signature for the software application framework may describe predicted incident severity levels for software incident data objects in a cluster of software incident data objects associated with the corresponding software incident data object. As another example, an incident signature for the software application framework may describe a trend in predicted incident severity levels for software incident data objects of the software application framework over time.

In some embodiments, an incident signature describes one or more inferred properties about an inferred cross-platform failure of a software application framework, where the one or more inferred properties are determined based on a predicted incident severity level that is identified by the software monitoring data management computing device. For example, the incident signature may describe that the software application framework is associated with n high-severity software incidents and m low-severity severity incidents. As another example, given that the software application framework is associated with n high-severity software incidents and m low-severity severity incidents, the incident signature for the software application framework may be associated based on the output of the equation $$\frac{n + m}{2}.$$

At operation 504, the software monitoring data management computing device 106 performs one or more prediction-based actions based on the one or more incident signatures. For example, performing the one or more prediction-based actions may include enabling display of a prediction output user interface that displays the one or more incident signatures. As another example, performing the one or more prediction-based actions may include enabling display of a prediction output user interface that is configured to receive one or more user feedback data objects for the one or more incident signatures. As yet another example, performing the one or more prediction-based actions may include enabling display of a prediction output user interface that is configured to display a ranking of one or more software incident data objects for the software application framework based on the predicted incident severity levels associated with the one or more software incident data objects. As a further example, performing the one or more prediction-based actions may include performing one or more automated system maintenance operations for the software application framework in accordance with the incident signatures. In some embodiments, an incident manager generates an incident review data object after filing a software incident. In some of those embodiments, the incident review data object is used to retrain the natural language processing machine learning framework. In some embodiments, the natural language processing machine learning framework is used to recommend incident review data objects and/or incident runbooks in the future, a feature that in turn leads to faster referencing and resolution of incidents.

In some embodiments, performing the prediction-based actions comprises generating user interface data for a prediction output user interface that describes a distribution of predicted incident severity levels for software incident data objects associated with a software application framework over a defined period of time, where the generation timestamps of all of the noted software incident data objects are within the defined period of time. An operational example of such a prediction output user interface 900 is depicted in FIG. 9. As depicted in FIG. 9, the prediction output user interface include a user interface element 901 depicting a relative quantity of software incident data objects associated with a corresponding period of time that have a minor predicted incident severity level, a user interface element

902 depicting a relative quantity of software incident data objects associated with the corresponding period of time that have a major predicted incident severity level, a user interface element 903 depicting a relative quantity of software incident data objects associated with the corresponding period of time that have a critical predicted incident severity level, and a user interface element 904 depicting a relative quantity of software incident data objects associated with the corresponding period of time that have a crisis predicted incident severity level.

In some embodiments, the software monitoring data management computing device 106 generates user interface data that displays, for a particular software incident data object, the predicted incident severity level for the software incident data object and a human-generated incident severity level for the software incident data object. An example of such a user interface 1000 is depicted in FIG. 10. As depicted in FIG. 10, the user interface 1000 displays, for a software incident data object that is associated with the alert identifier HOT 96626 (which is entered using the user interface element 1001), the predicted incident severity level 1003 and the human-generated incident severity level 1004. As further depicted in FIG. 10, the user interface 1000 displays the textual description 1002 for the software incident data object that is associated with the alert identifier HOT 96626.

In some embodiments, the software monitoring data management computing device 106 generates user interface data that displays an incident signature for a software application framework, where the incident signature describes recall measures, precision measures, and/or F-measures associated with predicted incident severity levels for a set of software incident data objects that are associated with a particular software application framework. For example, the user interface 1200 of FIG. 12 displays, for a set of software incident data objects that are associated with a time range selected using the user interface elements 1101-1102 of the user interface 1100 of FIG. 11), recall measures, precision measures, and $F_1$ measures using the user interface elements 1201-1209. FIG. 12 also provides the user interface element 1210 that depicts, using a left bra and a left bar, accuracy measures for human-generated incident severity levels and predicted incident severity levels for software incident data objects respectively.

In particular, the user interface element 1201 of FIG. 12 depicts, using a right bar and a left bar, the recall rates for predicted incident severity levels indicating a zeroth severity level and for human-generated incident severity levels indicating a zeroth severity level respectively. In other words, the user interface element 1201 depicts (using right left bar) the recall rate for those software incident data objects that are associated with the selected time range and predicted incident severity levels indicating a zeroth severity level, as well as (using the left bar) the recall rate for those software incident data objects that are associated with the selected time range and human-generated incident severity levels indicating a zeroth severity level.

In addition, the user interface element 1202 of FIG. 12 depicts, using a right bar and a left bar, the precision rates for predicted incident severity levels indicating a zeroth severity level and for human-generated incident severity levels indicating a zeroth severity level respectively. In other words, the user interface element 1202 depicts (using the right bar) the precision rate for those software incident data objects that are associated with the selected time range and predicted incident severity levels indicating a zeroth severity level, as well as (using the left bar) the precision rate for those software incident data objects that are associated with the selected time range and human-generated incident severity levels indicating a zeroth severity level.

Furthermore, the user interface element 1203 of FIG. 12 depicts, using a right bar and a left bar, the $F_1$ scores for predicted incident severity levels indicating a zeroth severity level and for human-generated incident severity levels indicating a zeroth severity level respectively. In other words, the user interface element 1203 depicts (using the right bar) the $F_1$ for those software incident data objects that are associated with the selected time range and predicted incident severity levels indicating a zeroth severity level, as well as (using the left bar) the $F_1$ for those software incident data objects that are associated with the selected time range and human-generated incident severity levels indicating a zeroth severity level.

Moreover, the user interface element 1204 of FIG. 12 depicts, using a right bar and a left bar, the recall rates for predicted incident severity levels indicating a first severity level and for human-generated incident severity levels indicating a first severity level respectively. In other words, the user interface element 1204 depicts (using the right bar) the recall rate for those software incident data objects that are associated with the selected time range and predicted incident severity levels indicating a first severity level, as well as (using the left bar) the recall rate for those software incident data objects that are associated with the selected time range and human-generated incident severity levels indicating a first severity level.

Additionally, the user interface element 1205 of FIG. 12 depicts, using a right bar and a left bar, the precision rates for predicted incident severity levels indicating a first severity level and for human-generated incident severity levels indicating a first severity level respectively. In other words, the user interface element 1205 depicts (using the right bar) the precision rate for those software incident data objects that are associated with the selected time range and predicted incident severity levels indicating a first severity level, as well as (using the left bar) the precision rate for those software incident data objects that are associated with the selected time range and human-generated incident severity levels indicating a first severity level.

Furthermore, the user interface element 1206 of FIG. 12 depicts, using a right bar and a left bar, the $F_1$ scores for predicted incident severity levels indicating a first severity level and for human-generated incident severity levels indicating a first severity level respectively. In other words, the user interface element 1206 depicts (using the right bar) the $F_1$ for those software incident data objects that are associated with the selected time range and predicted incident severity levels indicating a first severity level, as well as (using the left bar) the $F_1$ for those software incident data objects that are associated with the selected time range and human-generated incident severity levels indicating a first severity level.

Furthermore, the user interface element 1207 of FIG. 12 depicts, using a right bar and a left bar, the recall rates for predicted incident severity levels indicating a second severity level and for human-generated incident severity levels indicating a second severity level respectively. In other words, the user interface element 1207 depicts (using the right bar) the recall rate for those software incident data objects that are associated with the selected time range and predicted incident severity levels indicating a second severity level, as well as (using the left bar) the recall rate for those software incident data objects that are associated with the selected time range and human-generated incident severity levels indicating a second severity level.

Additionally, the user interface element 1208 of FIG. 12 depicts, using a right bar and a left bar, the precision rates for predicted incident severity levels indicating a second severity level and for human-generated incident severity levels indicating a second severity level respectively. In other words, the user interface element 1208 depicts (using the right bar) the precision rate for those software incident data objects that are associated with the selected time range and predicted incident severity levels indicating a second severity level, as well as (using the left bar) the precision rate for those software incident data objects that are associated with the selected time range and human-generated incident severity levels indicating a second severity level.

Moreover, the user interface element 1209 of FIG. 12 depicts, using a right bar and a left bar, the $F_1$ scores for predicted incident severity levels indicating a second severity level and for human-generated incident severity levels indicating a second severity level respectively. In other words, the user interface element 1209 depicts (using the right bar) the $F_1$ for those software incident data objects that are associated with the selected time range and predicted incident severity levels indicating a second severity level, as well as (using the left bar) the $F_1$ for those software incident data objects that are associated with the selected time range and human-generated incident severity levels indicating a second severity level. Accordingly, to address a range of challenges related to monitoring complex software application frameworks, various embodiments of the present invention describe techniques for generating incident signatures for a complex software application framework that are determined based on predicted incident severity levels for software incident data objects. These predicted incident severity levels may be generated by various machine learning techniques in order to generate effective incident signatures for a software application framework. By using the described techniques, various embodiments of the present invention generate predictive insights about severity levels of software incident data objects that can be used to increase efficiency and effectiveness of software application and software service monitoring. In doing so, various embodiments of the present invention make substantial technical contributions to improving the efficiency and the effectiveness of monitoring complex software application frameworks.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for predictive monitoring of a software application framework, the apparatus comprising at least one processor and at least one non-transitory memory comprising a computer program code, the at least one non-transitory memory and the computer program code configured to, with the at least one processor, cause the apparatus to:

generate a natural language feature data object for a software incident data object by applying a natural language feature extraction machine learning model to the software incident data object;

generate a structured data feature data object for the software incident data object by applying a structured data feature extraction machine learning model to the software incident data object;

generate, based on the natural language feature data object and the structured data feature data object, one or more incident signatures for the software application framework, wherein the one or more incident signatures describe one or more inferred incident properties for the software application framework that are based on at least one of: first severity level software incidents, second severity level software incidents, precision rates, recall rates, or F-measures, wherein the one or more inferred incident properties comprise at least a count of the first severity level software incidents associated with the software application framework and a count of the second severity level software incidents associated with the software application framework; and perform one or more prediction-based actions based on the one or more incident signatures.

2. The apparatus of claim 1, wherein the software incident data object comprises one or more natural language data fields, wherein the natural language feature extraction machine learning model is configured to process the one or more natural language data fields to generate the natural language feature data object.

3. The apparatus of claim 2, wherein the one or more natural language data fields comprise a message field.

4. The apparatus of claim 2, wherein the software incident data object comprises one or more structured data fields, wherein the structured data feature extraction machine learning model is configured to process the one or more structured data fields to generate the structured data feature data object.

5. The apparatus of claim 4, wherein the one or more structured data fields comprise a timestamp field for the software incident data object.

6. The apparatus of claim 4, wherein the one or more structured data fields comprise a window-adjusted timestamp that is determined based on a sliding window for the software incident data object, wherein the sliding window comprises a predefined number of temporally adjacent software incident data objects for the software incident data object.

7. The apparatus of claim 1, wherein performing the one or more prediction-based actions comprises generating user interface data for a prediction output user interface, wherein the user interface data is representative of a predicted incident severity level for the software incident data object.

8. The apparatus of claim 7, wherein the predicted incident severity level is generated, using an incident severity level detection machine learning model, based on the natural language feature data object and the structured data feature data object.

9. The apparatus of claim 1, wherein performing the one or more prediction-based actions comprises causing display of a prediction output user interface comprising the one or more incident signatures.

10. The apparatus of claim 1, wherein performing the one or more prediction-based actions comprises performing one or more automated system maintenance operations based on the one or more incident signatures.

11. A computer-implemented method for predictive monitoring of a software application framework, the computer-implemented method comprising:

generating a natural language feature data object for a software incident data object by applying a natural language feature extraction machine learning model to the software incident data object;

generating a structured data feature data object for the software incident data object by applying a structured data feature extraction machine learning model to the software incident data object;

generating, based on the natural language feature data object and the structured data feature data object, one or more incident signatures for the software application framework, wherein the one or more incident signatures describe one or more inferred incident properties for the software application framework that are based on at least one of: first severity level software incidents, second severity level software incidents, precision rates, recall rates, or F-measures, wherein the one or more inferred incident properties comprise at least a count of the first severity level software incidents associated with the software application framework and a count of the second severity level software incidents associated with the software application framework; and performing one or more prediction-based actions based on the one or more incident signatures.

12. The computer-implemented method of claim 11, wherein the software incident data object comprises one or more natural language data fields, wherein the natural language feature extraction machine learning model is configured to process the one or more natural language data fields to generate the natural language feature data object.

13. The computer-implemented method of claim 12, wherein the one or more natural language data fields comprise a message field.

14. The computer-implemented method of claim 12, wherein the software incident data object comprises one or more structured data fields, wherein the structured data feature extraction machine learning model is configured to process the one or more structured data fields to generate the structured data feature data object.

15. The computer-implemented method of claim 14, wherein the one or more structured data fields comprise a timestamp field for the software incident data object.

16. The computer-implemented method of claim 14, wherein the one or more structured data fields comprise a window-adjusted timestamp that is determined based on a sliding window for the software incident data object, wherein the sliding window comprises a predefined number of temporally adjacent software incident data objects for the software incident data object.

17. The computer-implemented method of claim 11, wherein performing the one or more prediction-based actions comprises generating user interface data for a prediction output user interface, wherein the user interface data is representative of a predicted incident severity level for the software incident data object.

18. The computer-implemented method of claim 17, wherein the predicted incident severity level is generated, using an incident severity level detection machine learning model, based on the natural language feature data object and the structured data feature data object.

19. The computer-implemented method of claim 11, wherein performing the one or more prediction-based actions comprises causing display of a prediction output user interface comprising the one or more incident signatures.

20. The computer-implemented method of claim 11, wherein performing the one or more prediction-based actions comprises performing one or more automated system maintenance operations based on the one or more incident signatures.

* * * * *